United States Patent
Nomiyama et al.

(10) Patent No.: US 7,774,338 B2
(45) Date of Patent: Aug. 10, 2010

(54) METHOD AND APPARATUS FOR DISPLAYING TEXT INFORMATION AND NUMERICAL INFORMATION IN ASSOCIATION WITH EACH OTHER

(75) Inventors: Hiroshi Nomiyama, Kawasaki (JP); Koichi Takeda, Machida (JP); Taijiroh Tsutsumi, Machida (JP)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 11/528,045

(22) Filed: Sep. 26, 2006

(65) Prior Publication Data

US 2007/0078834 A1    Apr. 5, 2007

(30) Foreign Application Priority Data

Sep. 30, 2005    (JP) .............................. 2005-287701

(51) Int. Cl.
G06F 7/00    (2006.01)
G06F 17/30   (2006.01)

(52) U.S. Cl. ...................................... 707/722; 707/741

(58) Field of Classification Search ...................... 707/3
See application file for complete search history.

(56) References Cited

U.S. PATENT DOCUMENTS

| 5,412,769 | A  | * | 5/1995 | Maruoka et al. | ............ 345/440 |
| 6,401,105 | B1 | * | 6/2002 | Carlin et al. | ................. 715/210 |
| 6,990,238 | B1 | * | 1/2006 | Saffer et al. | .................. 382/224 |
| 7,496,857 | B2 | * | 2/2009 | Stata et al. | ................... 715/833 |
| 2003/0131315 | A1 | * | 7/2003 | Escher | ....................... 715/512 |
| 2005/0055267 | A1 | * | 3/2005 | Chasanoff et al. | ............. 705/10 |
| 2005/0197992 | A1 | * | 9/2005 | Kipersztok et al. | ............ 706/50 |

FOREIGN PATENT DOCUMENTS

| JP | 07-141384     | 6/1995 |
| JP | 2000-322439   | 11/2000 |
| JP | 2000-332439   | 11/2000 |
| JP | 2002-245061   | 8/2002 |
| JP | 2003-050913   | 2/2003 |
| JP | 2004-78512    | 3/2004 |

(Continued)

OTHER PUBLICATIONS

Ogawa et al., Mining of Stock Prices and New Articles; vol. 2001, No. 20; ISSN 0919-6072; pp. 137-144. http://www.ipsj.or.jp.

(Continued)

*Primary Examiner*—Charles Rones
*Assistant Examiner*—Kris Mackes
(74) *Attorney, Agent, or Firm*—William Steinberg; Shimokaje & Associates, P.C.

(57) ABSTRACT

A method and apparatus for associating text information with numerical information. A first phrase corresponding to a time period is generated. The first phrase represents a change in first numerical information over the time period. The first numerical information includes time-series data pertaining to a financial index. The text information is retrieved through use of a retrieval condition that includes the first phrase. The first numerical information is retrieved through use of the retrieval condition and the first phrase. The extracted text information and the retrieved first numerical information are outputted in association with each other.

2 Claims, 11 Drawing Sheets

FOREIGN PATENT DOCUMENTS

| | | |
|---|---|---|
| JP | 2004-178490 | 6/2004 |
| JP | 2004-227070 | 8/2004 |
| JP | 2004-280810 | 10/2004 |

OTHER PUBLICATIONS

Nasukawa, et al.; Text analysis and knowledge mining system; IBM Systems Journal, vol. 40, No. 4; 2001; pp. 967-984.

True Teller; Nomura Research Institute; http://www.trueteller.net/about/testmining.html; 2 pages, Jul. 26, 2006.

Knowledge Power Web; Just System; http://www.justsystem.co.jp/km/; 2 pages, Jul. 26, 2006.

TableFinder, JustSystem Corporation, 2006, http://www.justsystem.co.jp/tf/, 1 page.

\* cited by examiner

FIG. 1

| DATE OF DELIVERY | NEWS ARTICLE |
|---|---|
| ⋮ | ⋮ |
| 2004/04/13 | SHARP RISE IN NY CRUDE OIL PRICE<br>NY CRUDE OIL PRICE FIRSTLY REACHED $50 RANGE IN CRUDE OIL FUTURES MARKET IN NY ON 10TH.<br>....<br>SHARP RISE IN THE CRUDE OIL PRICE HAS HAD A GREAT IMPACT ON AIRLINE MANAGEMENT, AND THEREBY THE STOCK PRICE OF COMPANY A IS CONTINUING ON A DOWNWARD TREND. |
| 2004/04/14 | GDP IN FISCAL 2003<br>GDP PRELIMINARY FIGURES OF JAPAN SHOW A GROWTH OF REAL 2% IN FISCAL 2003····<br>....<br>SINCE IT HAS EXCEEDED THE MARKET EXPECTATION,<br>THE STOCK PRICE INDEX OF THE TOKYO STOCK EXCHANGE··· |
| ⋮ | ⋮ |

FIG. 2A

| INFORMATION TITLE | NUMERICAL INFORMATION | | | | | | | |
|---|---|---|---|---|---|---|---|---|
| | .... | 3/27 | 3/28 | 3/29 | 4/1 | 4/2 | 4/3 | .... |
| ⋮ | | | | ⋮ | | | | |
| NY CRUDE OIL | .... | 46 | 46 | 48 | 47 | 48 | 47 | .... |
| | | | | ⋮ | | | | |
| STOCK PRICE OF COMPANY A | .... | 231 | 233 | 218 | 236 | 235 | 237 | .... |
| | | | | ⋮ | | | | |

FIG. 1
NY CRUDE OIL
FUTURES PRICE

FIG. 2
COMPANY A STOCK
PRICE CHART

INFORMATION TO BE OUTPUTTED

ON 10TH, THE CRUDE OIL PRICE FIRST REACHED THE RANGE OF $50 IN NY CRUDE OIL FUTURES MARKET. SHARP RISE IN CRUDE OIL PRICE (REFER TO FIG. 1) HAS HAD A GREAT IMPACT ON AIRLINE MANAGEMENT, AND THEREBY THE STOCK PRICE OF COMPANY A IS CONTINUING ON A DOWNWARD TREND (REFER TO FIG. 2).

TEXT INFORMATION

ON 10TH, THE CRUDE OIL PRICE FIRST REACHED THE RANGE OF $50 IN NY CRUDE OIL FUTURES MARKET. SHARP RISE IN CRUDE OIL PRICE HAS HAD A GREAT IMPACT ON AIRLINE MANAGEMENT, AND THEREBY THE STOCK PRICE OF COMPANY A IS CONTINUING ON A DOWNWARD TREND.

METHOD AND APPARATUS FOR DISPLAYING TEXT INFORMATION AND NUMERICAL INFORMATION IN ASSOCIATION WITH EACH OTHER

FIELD OF THE INVENTION

The present invention relates to an apparatus and method for displaying text information in association with numerical information.

BACKGROUND OF THE INVENTION

In recent years, with the spread of an information-processing apparatus and the development of a communication network, an amount of information that the information-processing apparatus can turn into a target of processing has become enormous. The information that the information-processing apparatus can turn into a target of processing is roughly classified into two types of information, namely, structured information and unstructured information. The structured information includes numerical information such as time-series data, text information classified for every item, or the like. The unstructured information includes text information that is not classified for every item, an image, a voice, or the like. Conventionally, it was difficult to turn the unstructured information into a target of processing as compared with the structured information. However, with the development of a data-mining technique, it has gradually come to be able to turn the same into a target of processing.

The structured information such as the time-series data, unlike the unstructured information, can be represented by a graph, a table, or the like. For this reason, it is often the case that the structured information is more suitable to intuitively understand a change of a value or the like than the unstructured information. Meanwhile, since the structured information only represents a quantitative fact, it is difficult to grasp a fact from the structured information. For example, in the time-series data of a stock price, even if a decline in stock price is observed, the reason cannot be grasped. The structured information may be insufficient for understanding the background fact for this reason, and therefore, the unstructured information, for example, data of newspaper articles or the like is required.

SUMMARY OF THE INVENTION

The present invention provides a method for associating text information with numerical information, comprising:

generating a first phrase corresponding to a time period such that the first phrase represents a change in first numerical information over the time period, said first numerical information comprising time-series data pertaining to a financial index;

retrieving the text information through use of a retrieval condition that includes the first phrase;

retrieving the first numerical information through use of the retrieval condition and the first phrase; and outputting the extracted text information and the retrieved first numerical information in association with each other.

The present invention provides an information-processing apparatus comprising a processor and a computer readable memory unit coupled to the processor, said memory unit containing instructions that when executed by the processor implement a method for associating text information with numerical information, said method comprising:

generating a first phrase corresponding to a time period such that the first phrase represents a change in first numerical information over the time period, said first numerical information comprising time-series data pertaining to a financial index;

retrieving the text information through use of a retrieval condition that includes the first phrase;

retrieving the first numerical information through use of the retrieval condition and the first phrase; and outputting the extracted text information and the retrieved first numerical information in association with each other.

The present invention provides an apparatus and method to accurately retrieve text information closely associated with numerical information (e.g., time-series data), and to display the text information in association with the numerical information.

DETAILED DESCRIPTION OF THE INVENTION

The method and an information-processing apparatus of the present invention accurately retrieves text information closely associated with numerical information such as time-series data or the like, and displays the retrieved text information in association with the numerical information. The information-processing apparatus associates the text information with the time-series numerical information. The information-processing apparatus includes a generation unit for generating a first phrase indicating a change of first numerical information in a certain period, a first retrieval unit for retrieving text information matching with a retrieval key including the first phrase from among a plurality of pieces of text information turned into a retrieval target, and an output unit for outputting the retrieved text information, in association with the first numerical information in the period. In this information-processing apparatus, the first retrieval unit may retrieve text information describing that the first numerical information has made a change represented by the first phrase from among the text information created or announced in the period among the plurality of pieces of text information.

Thus, present invention provides an information-processing apparatus, a method, and a program product for associating text information with time-series numerical information of a certain index. The apparatus includes a first phrase database, an association unit, and an output unit. The first phrase database is for storing at least one first phrase generated based on a change of the numerical information and indicative of the change of the numerical information in a certain period in association with the period and the numerical information. The association unit is for associating the text information with the numerical information based on the first phrase. The output unit is for outputting the numerical information in the period corresponding to the first phrase and the text information, which are associated with each other by the association unit.

According to the present invention, it is possible to accurately retrieve the text information closely associated with the numerical information such as the time-series data, and to display the text information in association with the numerical information.

Figure 1:
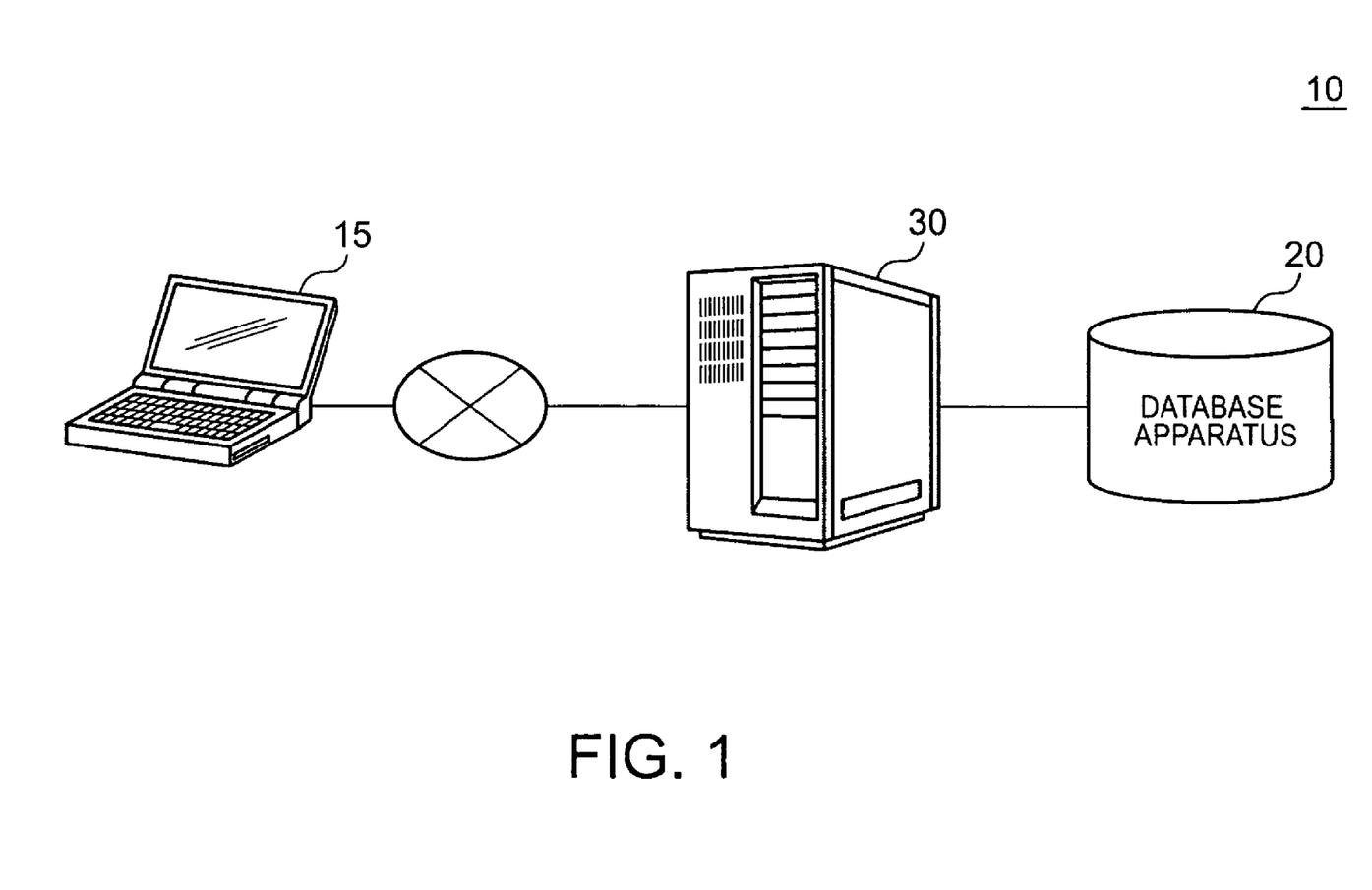
FIG. 1 illustrates an information processing system that includes a database apparatus and an information-processing apparatus, in accordance with embodiments of the present invention.

FIG. 1 illustrates an information processing system 10, in accordance with embodiments of the present invention. The information processing system 10 comprises a user terminal 15, a database apparatus 20, and an information-processing apparatus 30. The user terminal 15 is provided with an interface such as a web browser or the like, and communicates with the information-processing apparatus 30 in compliance with an instruction of a user. Additionally, the user terminal 15 displays information received from the information-processing apparatus 30 to the user. The database apparatus 20 records the numerical information such as information showing a change of financial indexes or economic indicators according to the time passage, and the text information such as news articles reporting the change of the financial indexes or the economic indicators.

The information-processing apparatus 30 retrieves the database apparatus 20 based on the instructions received from the user terminal 15, and outputs retrieved numerical information in association with the text information to the user terminal 15. As a result, the text information and the time-series numerical information are displayed to the user in association with each other. By accurately retrieving the text information, the information-processing apparatus 30 prevents an unrelated news articles from easily mixing therein, thus increasing a user's convenience.

Figure 2A:
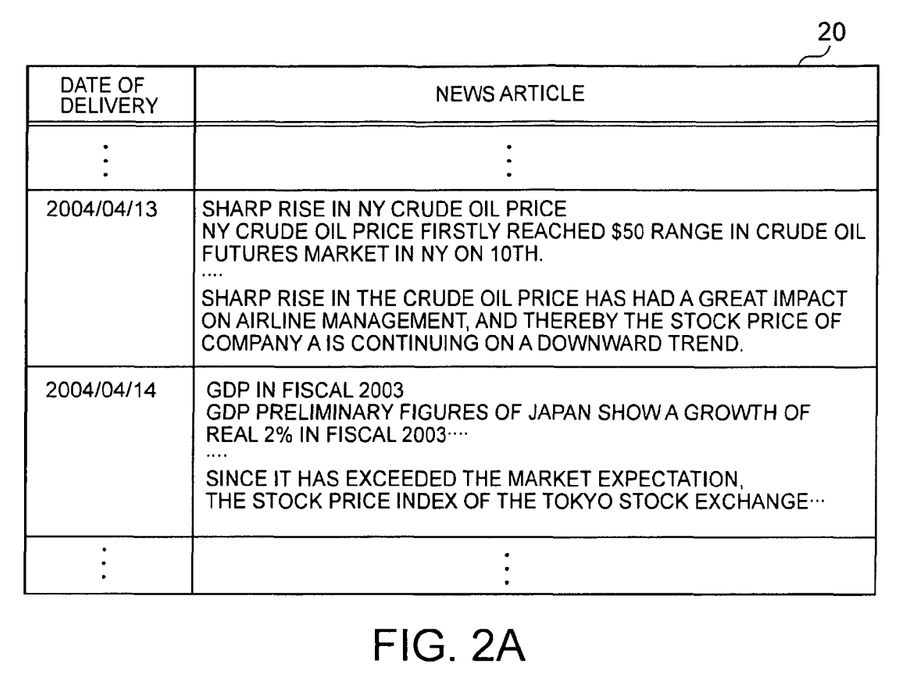
FIGS. 2A and 2B illustrate an example of a data structure of the database apparatus of FIG. 1, in accordance with embodiments of the present invention.
Figure 2B:
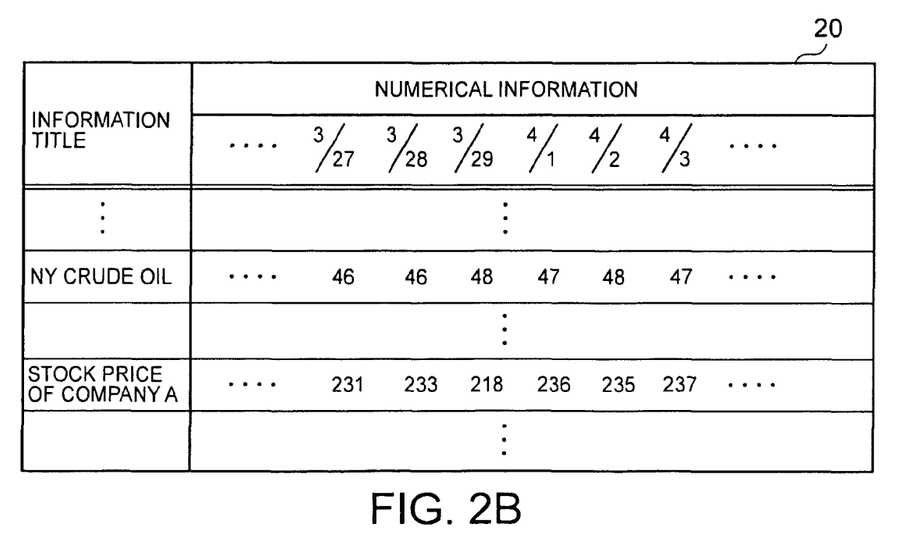

FIGS. 2A and 2B illustrates an example of a data structure of the database apparatus 20 of FIG. 1, in accordance with embodiments of the present invention. FIG. 2A illustrates an example of the text information recorded in the database apparatus 20. The database apparatus 20 records contents of the text information in association with a date of delivery of the text information. In the example of FIG. 2A, the delivery day is a date, and the contents of the text information are news articles. For example, the news articles regarding a sharp rise in NY crude oil price is recorded in association with the date of Apr. 13, 2004. In addition, the news article regarding GDP in fiscal 2003 is recorded in association with the date of Apr. 14, 2004.

FIG. 2B illustrates an example of the numerical information recorded in the database apparatus 20 of FIG. 1. The database apparatus 20 records each of a plurality of pieces of numerical information in association with a title of the numerical information. In the example shown in FIG. 2B, the Information Title of the numerical information is a name of a financial index. The Numerical Information is a closing price of the financial index on each trading day. For example, in association with the title of NY crude oil, a closing price (46 through 48 dollars) of the NY crude oil on each trading day is recorded. Additionally, in association with the title of stock price of Company A, a closing price on each trading date (218 yen through 237 yen) of the stock price of Company A is recorded. Note herein that, the numerical information is information showing a change of financial indexes or economic indicators according to the time passage. For example, the numerical information may be not only a price but also a trading volume. Specifically, the numerical information may be an import amount or an export amount of the crude oil, or alternatively, may be a trading volume of an industrial product or the like.

Figure 3:
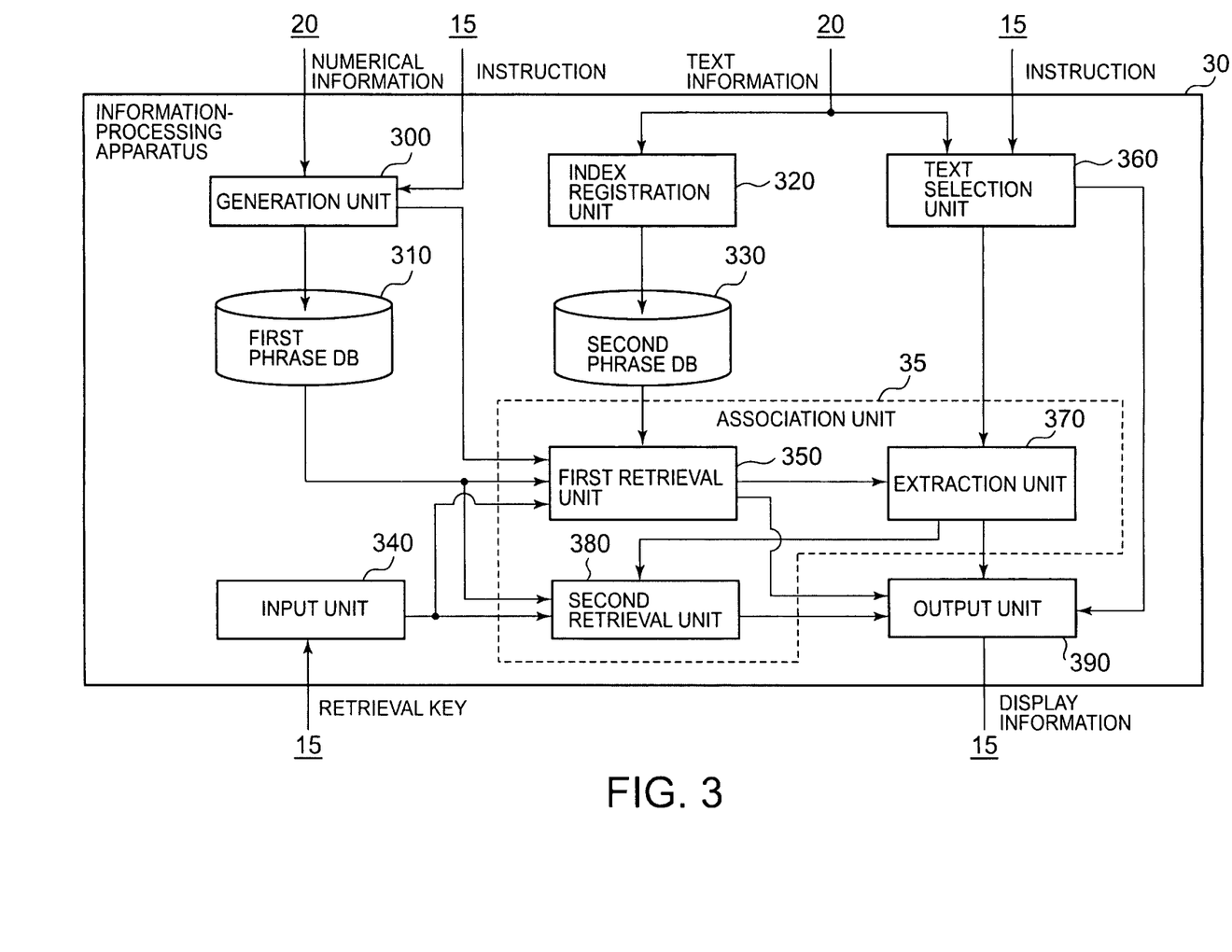
FIG. 3 illustrates an example of a functional configuration of an information-processing apparatus of FIG. 1, in accordance with embodiments of the present invention.

FIG. 3 illustrates an example of a functional configuration of an information-processing apparatus 30 of FIG. 1, in accordance with embodiments of the present invention. The information-processing apparatus 30 has a generation unit 300, a first phrase database (DB) 310, an index registration unit 320, a second phrase DB 330, an input unit 340, an association unit 35, a text selection unit 360, and an output unit 390. The generation unit 300 generates, for each numerical information of a plurality of pieces of numerical information, a first phrase representing a change of the numerical information at least in one period in association with the period and the numerical information. The first phrase DB 310 stores the generated first phrase representing the change of the numerical information in association with the period and the numerical information. The generation unit 300 may generate, based on the instruction received from the user terminal 15, only the first phrase representing the change of certain numerical information in a specified period. This generated first phrase may be outputted to a first retrieval unit 350 without being stored in the first phrase DB 310.

The index registration unit 320 retrieves, for each of a plurality of pieces of text information, a second phrase included in the text information and indicative of a change of at least one piece of numerical information, and registers the same as index information for each piece of text information. The registered index information is stored in the second phrase DB 330. By this processing, an increase in efficiency of the retrieval of the text information including a certain second phrase can be achieved. The input unit 340 enters the retrieval condition for retrieving the numerical information and the text information from the user terminal 15.

The association unit 35 associates the text information with the numerical information based on the first phrase stored in the first phrase DB 310. Specifically, the association unit 35 contains the first retrieval unit 350, an extraction unit 370, and a second retrieval unit 380. The first retrieval unit 350, in response to having received the first phrase from the generation unit 300, retrieves the text information from among the plurality of pieces of text information turned into the retrieval target using the retrieval condition including the first phrase. Specifically, the first retrieval unit 350 may normalize the first phrase in a phrase of a superordinate concept or a subordinate concept with a predetermined synonym dictionary or the like, and retrieve the text information including the normalized phrase. Note herein that, the first retrieval unit 350, in response to the input unit 340 entering the retrieval condition, may retrieve the text information matching with the retrieval condition. The index information stored in the second phrase DB 330 may be used for these retrievals.

The text selection unit 360 selects, based on the instruction received from the user terminal 15, certain text information from among the pieces of text information stored in the database apparatus 20. In response to the text information having been selected by the text selection unit 360, or in response to the text information having been retrieved by the first retrieval unit 350, the extraction unit 370 extracts a second phrase representing a change of at least one piece of numerical information from the text information. In response to the input unit 340 having entered the retrieval condition, the second retrieval unit 380, by retrieving the first phrase using the retrieval condition, retrieves the numerical information corresponding to the first phrase from among the plurality of pieces of numerical information. Additionally, the second retrieval unit 380, in response to the second phrase having been extracted by the extracting unit 370, may retrieve the period corresponding to the first phrase matching with the retrieval condition in the numerical information in which the second phrase represents the change, by retrieving the first phrase using the retrieval condition including the second phrase.

The output unit 390 outputs the text information retrieved by the first retrieval unit 350 or the text information selected by the text selection unit 360 to the user terminal 15 in association with the numerical information retrieved by the second retrieval unit 380 or the like. As a result, the text information and the numerical information can be displayed on the screen of the user terminal 15 in association with each other. The text information can be displayed in association with the time period corresponding to the first phrase matching with the retrieval condition in the numerical information. The numerical information retrieved by the second retrieval unit 380 can be displayed in association with the second phrase extracted from the text information by the extraction unit 370.

Figure 4:
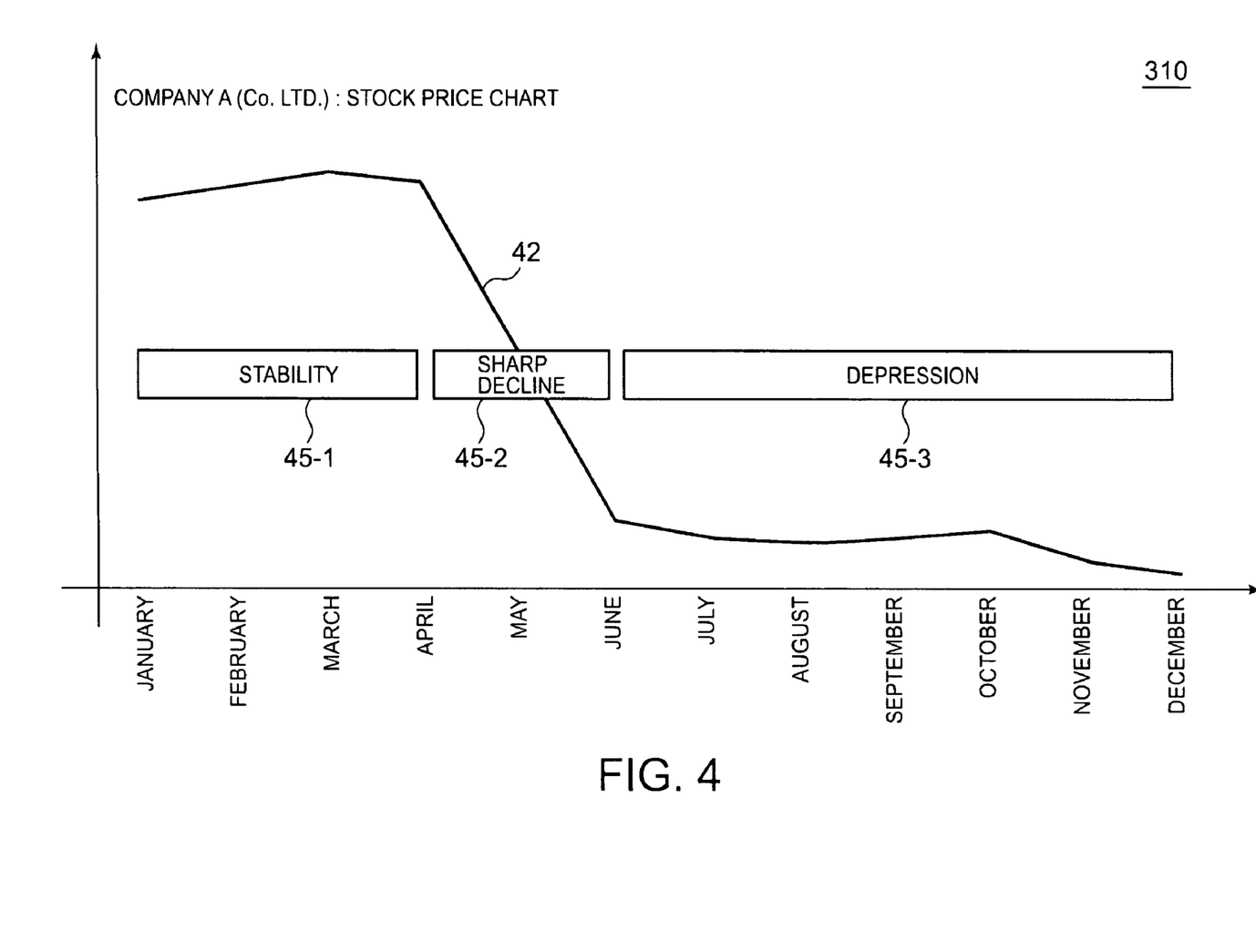
FIG. 4 illustrates an example of data recorded on a first phrase database in the information-processing apparatus of FIG. 3, in accordance with embodiments of the present invention.

FIG. 4 illustrates an example of the data recorded on the first phrase DB 310 in the information-processing apparatus of FIG. 3, in accordance with embodiments of the present invention. The first phrase DB 310 stores, for each of the plurality of pieces of numerical information, the first phrase representing the change of the numerical information at least in one period in association with the period and the numerical information. In FIG. 4, one certain piece of numerical information among the plurality of pieces of numerical information is exemplified. This numerical information represents the stock price of Company A (Co. Ltd.). The stock price is represented with a chart 42. The first phrase DB 310 stores a first phrase 45-1 showing the change of the stock price of Company A in the period from January to March in association with the period and the stock price.

For example, the stock price of this Company A remains stable in the period from January to March, sharply declines in the period from the end of April to the beginning of June, and is depressed in the period from the beginning of June up to December. As a result, the first phrase DB 310 stores the first phrase 45-1, which represents stability of the stock price, in association with the period from January to March. In addition, the first phrase DB 310 stores a first phrase 45-2, which represents a sharp decline of the stock price, in association with the period from the end of April to the beginning of June. Moreover, the first phrase DB 310 stores a first phrase 45-3, which represents a depression of the stock price, in association with the period from the beginning of June to December. In FIG. 4, for convenience of description, the first phrase corresponding to each period is further displayed on a graph representing the stock price of Company A. In practice, the first phrase DB 310 may store each of these first phrases in association with the numerical information and the period as a database in tabular form.

Figure 5:
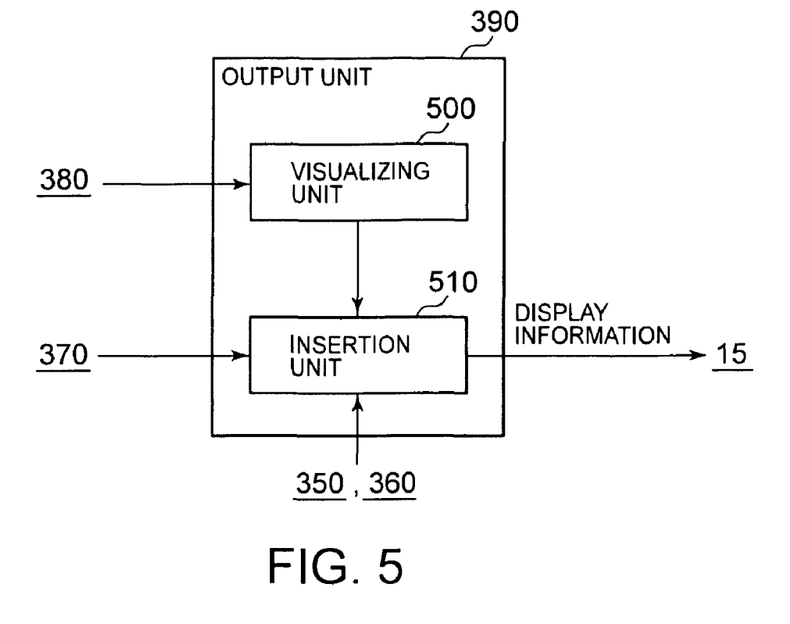
FIG. 5 illustrates an example of a functional configuration of an output unit in the information-processing apparatus of FIG. 3, in accordance with embodiments of the present invention.

FIG. 5 illustrates an example of a functional configuration of the output unit 390 in the information-processing apparatus of FIG. 3, in accordance with embodiments of the present invention. In a processing form (for example, a third embodiment to be hereinafter described) where the numerical information is outputted, being attached to the text information, the output unit 390 serves based on the configuration shown in FIG. 5. The output unit 390 has a visualizing unit 500 and an insertion unit 510. The visualizing unit 500 generates a diagram showing the change of the numerical information in which the second phrase represents the change. Meanwhile, the insertion unit 510 inserts, in association with the second phrase in the text information selected by the text selection unit 360, a text indicating a reference to the diagram. When the stock price chart is generated as, for example, a diagram X, the insertion unit 510 may insert a statement "(refer to the diagram X)" or the like in a portion where a phrase representing a rise and decline of the stock price in the text information comes into being. The output unit 390 then outputs the text information in which the reference to the graph or the table is inserted, and the diagram.

Three examples in which information is displayed by the information-processing apparatus 30 is shown next. These three examples illustrate a first embodiment, a second embodiment, and a third embodiment of the present invention.

Figure 6:
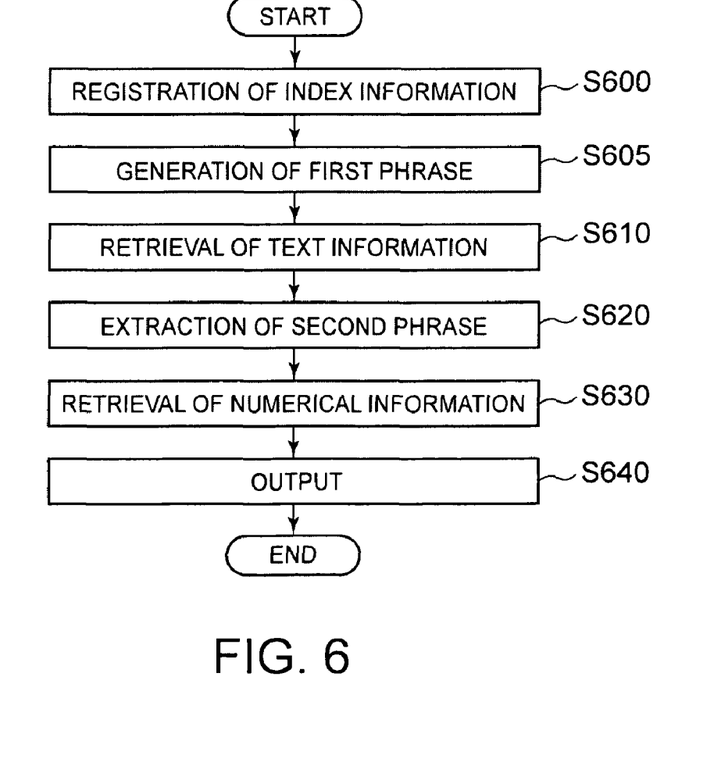
FIG. 6 illustrates a process flow in an example illustrating a first embodiment of the present invention, where the information-processing apparatus of FIG. 3 outputs the text information in association with the numerical information.

FIG. 6 illustrates a process flow in the example illustrating a first embodiment of the present invention, where the information-processing apparatus 30 of FIG. 3 outputs the text information in association with the numerical information. FIG. 7 illustrates a display example of a screen of a user terminal 15 in the information-processing apparatus 30 of FIG. 3 in the example of the first embodiment illustrated in FIG. 6. This example, pertaining to the first embodiment, illustrates displaying, in association with the unstructured information such as a stock price chart of a certain specific company in a specific period, information from news articles associated with a price movement in the specific period.

First, the index registration unit 320 preliminarily retrieves, for each of the plurality of pieces of text information, a second phrase included in the text information and indicative of a change of at least one piece of numerical information, and registers the same as index information for each piece of text information (S600). The generation unit 300 generates, based on the instruction received from the user terminal 15, a first phrase representing a change of certain first numerical information in a certain period (S605). The "certain period" in the present embodiment means a period from the middle of April to the middle of June, and the "first numerical information" means a stock price of Company A.

More specifically, the generation unit 300 generates the first phrase based on a increasing rate of the index in the period. For example, on condition that the increasing rate of the index is higher than a predetermined positive threshold in the period, the generation unit 300 generates the first phrase indicating that the index has sharply risen. Meanwhile, on condition that the increasing rate of the index is lower than a predetermined negative threshold in the period, the generation unit 300 generates the first phrase indicating that the index has sharply declined. Moreover, on condition that an absolute value of the increasing rate of the index is lower than a predetermined threshold in the period, the generation unit 300 generates the first phrase indicating that the index has stably shifted. Specifically, the first phrase is a phrase such as "sharp drop", "sharp rise", or "stability".

As further another example, the generation unit 300 may generate the first phrase based on a difference between the index in the period and the index in a period prior to the period. For example, on condition that an average value or a total value of the index in the period is not lower than an average value or a total value of the index in a period prior to the period by a predetermined difference value between thresholds, the generation unit 300 generates the first phrase indicating that the index has shifted at a high value. Meanwhile, on condition that the average value or the total value of the index in the period is less than the average value or the total value of the index in a period prior to the period by the predetermined difference value between thresholds, the generation unit 300 generates the first phrase indicating that the index has shifted at a low value. Specifically, the first phrase is a phrase such as "depression", "sharp rise", or "firm tone".

Alternatively, irrespective of the instruction received from the user terminal 15, the generation unit 300 may preliminarily generate, for each of the plurality of pieces of numerical information, the first phrase representing the change of the numerical information in a plurality of periods in association with the period and the numerical information. For example, the generation unit 300 generates "stability" as the first phrase corresponding to the stock price of Company A in January, and generates "stability" also as the first phrase corresponding to the stock price of Company A in February. The same thing may be said about March and subsequent months. Further, the generation unit 300 may similarly generate the phrase representing a monthly change also for the numerical information other than the stock price of Company A, for example, NY crude oil futures price or the like.

The first retrieval unit 350 retrieves the text information from among the plurality of pieces of text information turned into the retrieval target, using the retrieval condition including the generated first phrase (S610). Specifically, the first retrieval unit 350 retrieves the text information describing that the first numerical information has made a change represented by the first phrase in the period from among the plurality of pieces of text information. More specifically, the first retrieval unit 350 may retrieve the text information according to the following procedures. First, the first retrieval unit 350 selects the text information created or announced in this period from among the plurality of pieces of text information. A range may be given to this period. For example, the first retrieval unit 350 may select the text information created or issued in a period including 10% of periods before and after this period. Subsequently, the first retrieval unit 350 retrieves the text information from among the selected pieces of text information using the first phrases (for example, sharp drop or the like), and a title of the first numerical information (for example, stock price of Company A). The phrases retrieved here may be one word such as "sharp drop", a phrase normalized such as from "sharp decline" to "sharp drop" may be retrieved as the same phrase, or a phrase such as from "sharply dropped" to "sharp drop" may be retrieved. That makes it possible to retrieve the text information with high degree of accuracy and without missing appropriate text information.

Alternatively, the first retrieval unit 350 may retrieve the text information according to the following procedures. First, the first retrieval unit 350 retrieves the text information including a description showing the change in this period from among the plurality of pieces of text information. For example, the first retrieval unit 350 extracts a representation "due to a sharp rise in the crude oil price in 2000" from certain text information. The first retrieval unit 350 then converts this extracted representation into a period of "2000/01-2000/12". Subsequently, on condition that a given period and this period of "2000/01-2000/12" match with each other, (for example, on condition that there is an overlapping portion in the period), the first retrieval unit 350 retrieves the text information including this representation as the text information including the description showing the change in the given period. The conversion processing from a representation into a period may include various variations other than the aforementioned example. For example, if a representation "it is expected that the crude oil price will increase in the future" is included in the text information created on 2000/01/01, the first retrieval unit 350 may convert this representation into an open period of "2000/01 to". Further, if a representation "in the future" is included in certain text information, the first retrieval unit 350 may convert the representation from the text information creating date into a period of one to two years. Thus, a default value may be applied to the end of the period.

In the present embodiment, information from news articles (e.g., "sharp rise in NY crude oil price") is retrieved as the text information. Next, in response to the text information having been retrieved by the first retrieval unit 350, the extraction unit 370 extracts the second phrase representing a change of other numerical information from the text information (S620). In the present embodiment, the other numerical information is a "crude oil price", and the second phrase is a "sharp rise" representing the change.

In response to the second phrase having been extracted by the extraction unit 370, the second retrieval unit 380 retrieves, using the retrieval condition including the second phrase, the other numerical information corresponding to the first phrase matching with the retrieval condition (S630). In addition, the second retrieval unit 380 may retrieve the period corresponding to the first phrase matching with the retrieval condition in the numerical information.

Figure 7A:
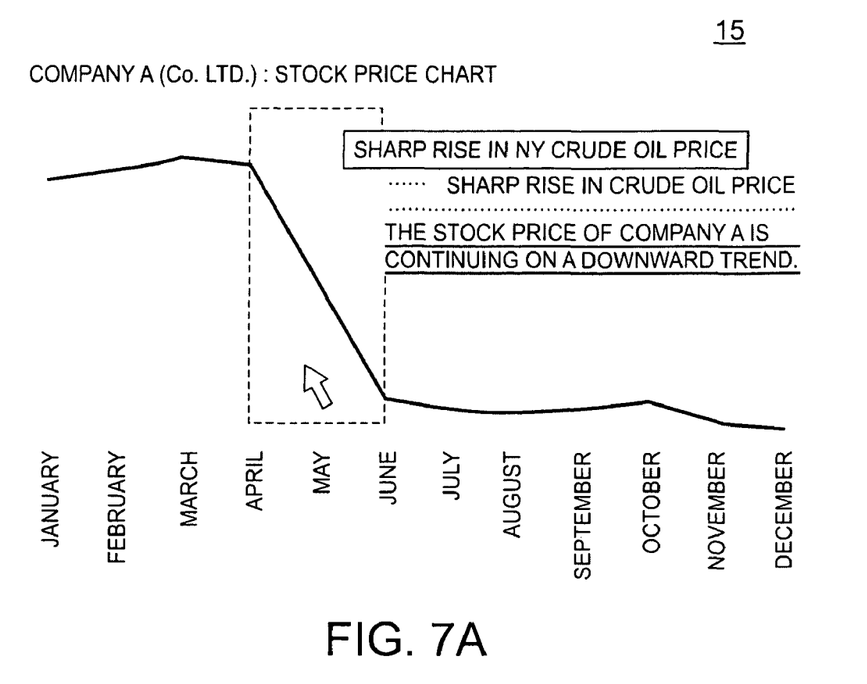
FIG. 7 illustrates a display example of a screen of a user terminal in the information-processing apparatus of FIG. 3 in the example of the first embodiment illustrated in FIG. 6.

The output unit 390 outputs the text information retrieved at S610 in association with the first numerical information in the period (S640). The specific example is shown in FIG. 7A. In response to the output of the output unit 390, the user terminal 15 displays the news of "sharp rise in NY crude oil price" in association with a portion corresponding to the period from April to June of the stock price of Company A. Further, in this case, the output unit 390 may output the text information retrieved by the first retrieval unit 350 to be displayed to the user so that the part corresponding to the retrieval condition may be identifiable. In the present embodiment, since the phrases of "stock price" of "Company A" and "sharp drop" correspond to the retrieval condition, these phrases may be displayed with, for example, an underline, so as to be identifiable to the user.

Figure 7B:
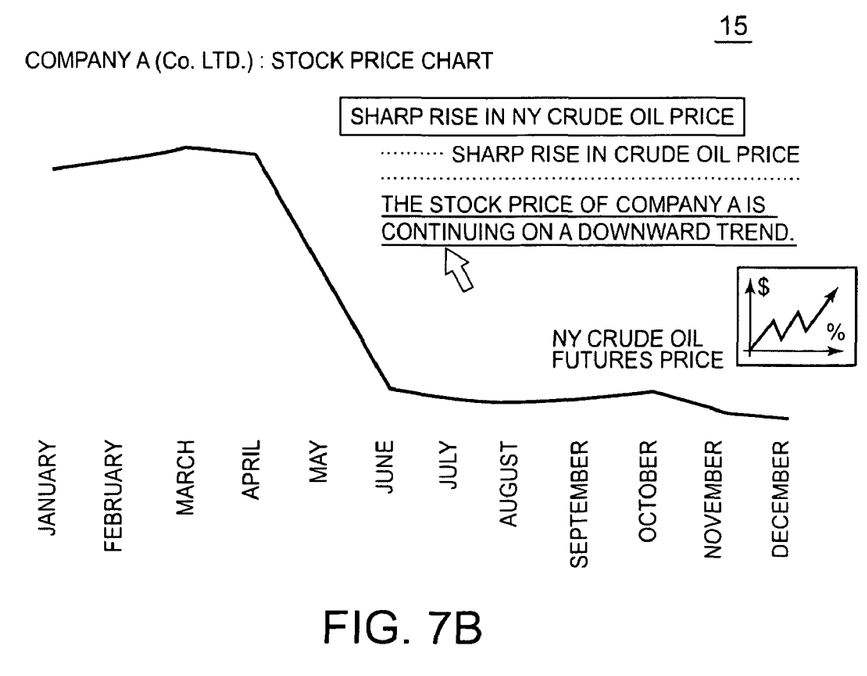

Moreover, when the part corresponding to the retrieval condition is selected by the user, (for example, when the part is clicked by the user with a mouse), the output unit 390 outputs the other numerical information retrieved by the second retrieval unit 380 in association with the retrieved text information. The specific example is shown in FIG. 7B. In response to the output of the output unit 390, the user terminal 15 displays a chart of the NY crude oil futures price that is the numerical information in association with the news of "sharp rise in NY crude oil price".

Figure 8:
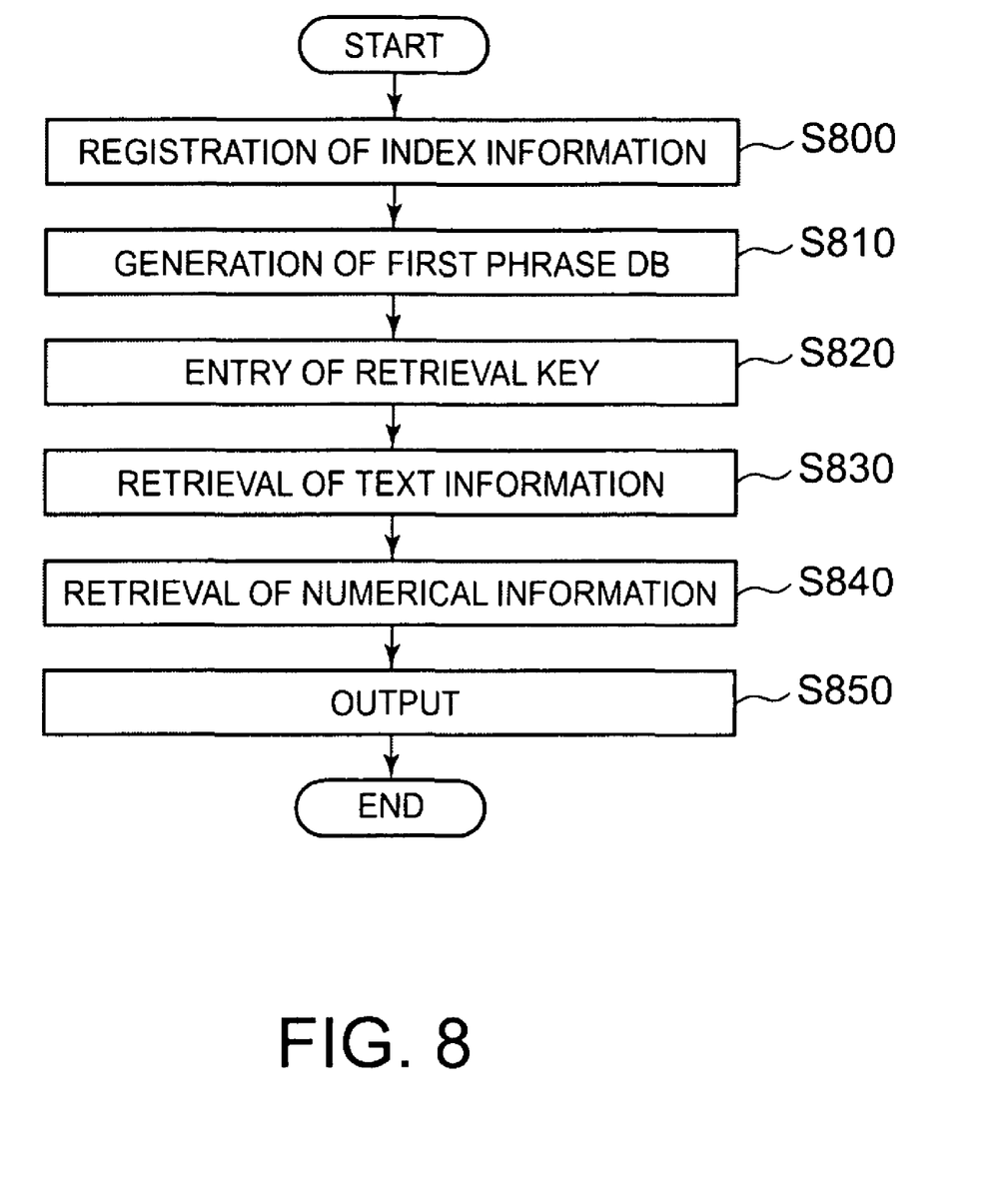
FIG. 8 illustrates a process flow in an example illustrating a second embodiment of the present invention, where the information-processing apparatus of FIG. 3 outputs the text information in association with the numerical information.
Figure 9:
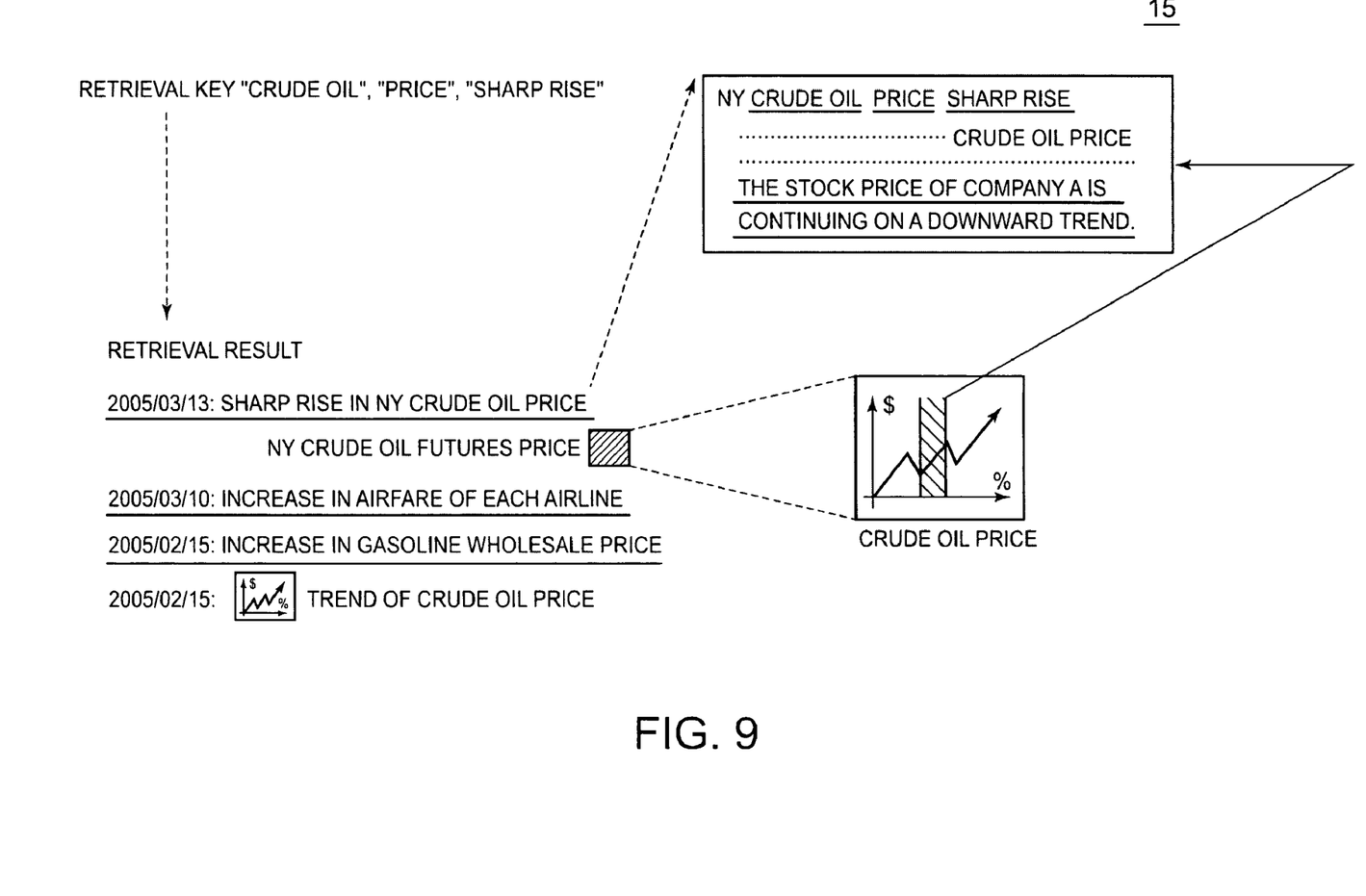
FIG. 9 illustrates a display example of a screen of a user terminal in the information-processing apparatus of FIG. 3 in the example of the first embodiment illustrated in FIG. 8.

FIG. 8 illustrates a process flow in the example illustrating a second embodiment of the present invention, where the information-processing apparatus 30 of FIG. 3 outputs the text information in association with the numerical information. FIG. 9 illustrates a display example of a screen of a user terminal 15 in the information-processing apparatus 30 of FIG. 3 in the example of the second embodiment illustrated in FIG. 8. This example, pertaining to the second embodiment, illustrates accurately retrieving, upon entering a certain specific retrieval condition, the structured information such as a stock price chart matching with the condition, and the unstructured information such as the news articles matching with the condition to display those in association with each other.

First, the index registration unit 320 preliminarily retrieves, for each of the plurality of pieces of text information, a second phrase included in the text information and indicative of a change of at least one piece of numerical information, and registers the same as index information for each piece of text information (S800). Next, the generation unit 300 generates, for each of the plurality of pieces of numerical information, a first phrase representing a change of the numerical information at least in one period, in association with the period and the numerical information. The generated first phrase is stored in the first phrase DB 310 (S810).

Next, the input unit 340 enters a retrieval condition for retrieving the numerical information and the text information (S820). For example, in the present embodiment, the input unit 340 enters the retrieval condition in which the retrieval keys of "crude oil", "price", and "sharp rise" are all included. The first retrieval unit 350 then retrieves the text information from among the plurality of pieces of text information using the retrieval condition (S830). For example, by retrieving the second phrase using the retrieval condition, the first retrieval unit 350 may retrieve the text information corresponding to the index information including the second phrase, based on the first phrase DB 310. Meanwhile, the second retrieval unit 380 retrieves the numerical information corresponding to the first phrase matching with the retrieval condition form among the plurality of pieces of numerical information (S840).

The output unit 390 then outputs the text information retrieved by the first retrieval unit 350, and the numerical information retrieved by the second retrieval unit 380 in association with each other (S850). The specific example thereof is shown in FIG. 9. The user terminal 15 first displays, in response to the output of the second retrieval unit 380, a list of headlines or titles of the text information and the numerical information retrieved according to the retrieval conditions. For example, the user terminal 15 displays a title of "Sharp rise in NY crude oil price", a title of "Airlines raise airfare", and a title of "Raised gasoline wholesale price" in this order. In this case, the user terminal 15 displays a title of the numerical information of the NY crude oil futures price in association with the title of "Sharp rise in NY crude oil price".

When either of the text information or the numerical information is selected by the user, the user terminal 15 will display the details of the selected information. For example, when the title of "Sharp rise in NY crude oil price" is selected, the output unit 390 will display contents of the article. Meanwhile, when the title of "NY crude oil futures price" is selected, the output unit 390 displays the numerical information as a chart. Incidentally, the output unit 390 may display a part corresponding to the retrieval condition from among the pieces of text information to be identifiable to the user, for example, with an underline. In addition, the output unit 390 may output the text information in association with the period corresponding to the first phrase matching with the retrieval condition in the numerical information. Namely, in the example shown in FIG. 9, it is possible, by illustrating an area of an applicable period with oblique lines on the chart of the numerical information, to display an arrowhead from the period to the news articles.

Further, the output unit 390 may display a phrase showing a change of other numerical information among the pieces of text information so as to be identifiable to the user. When this phrase is selected by the user, the output unit 390 may further output the numerical information in which the phrase indicates the change, in a manner similar to the example shown in FIG. 7. Namely, for example, when a phrase "Stock price of Company A" in the text information is selected, the output unit 390 may further output the numerical information of the stock price of Company A. Since this processing has already been described in FIG. 6, description thereof will be omitted.

Figure 10:
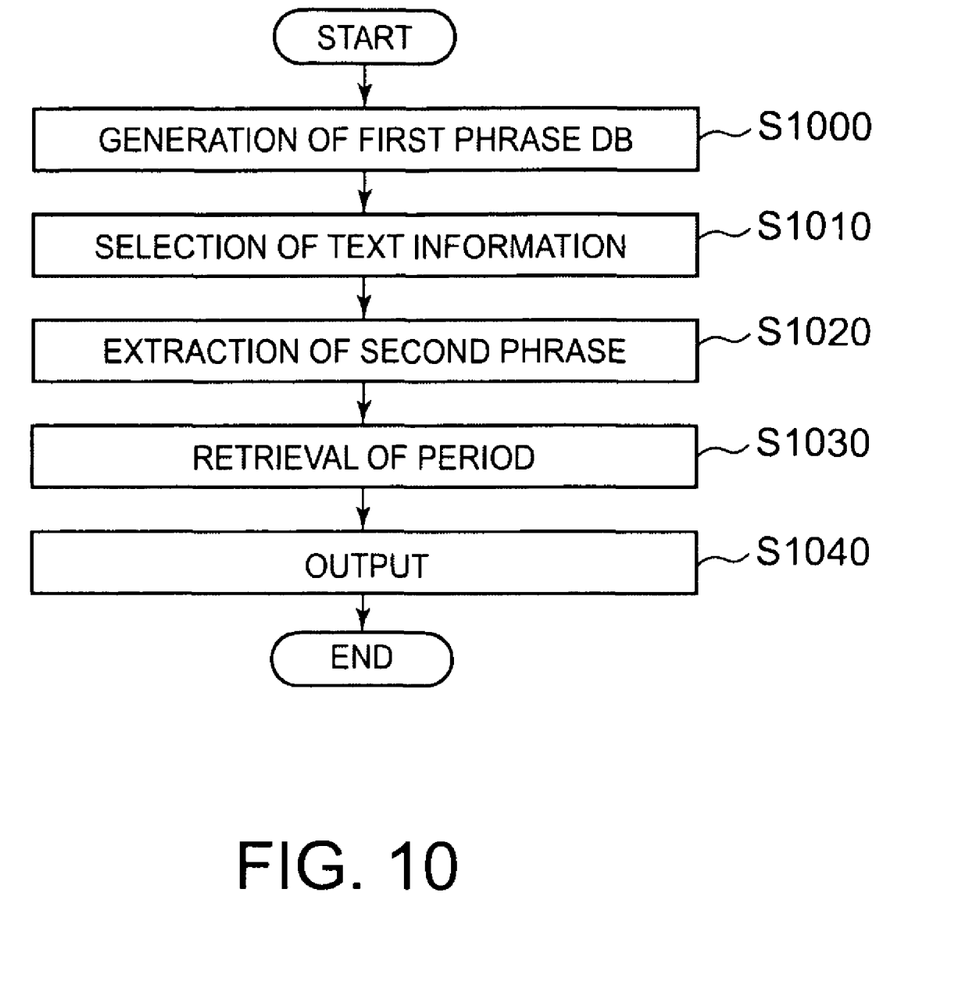
FIG. 10 illustrates a process flow in an example illustrating a third embodiment of the present invention, where the information-processing apparatus of FIG. 3 outputs the text information in association with the numerical information.
Figure 11:
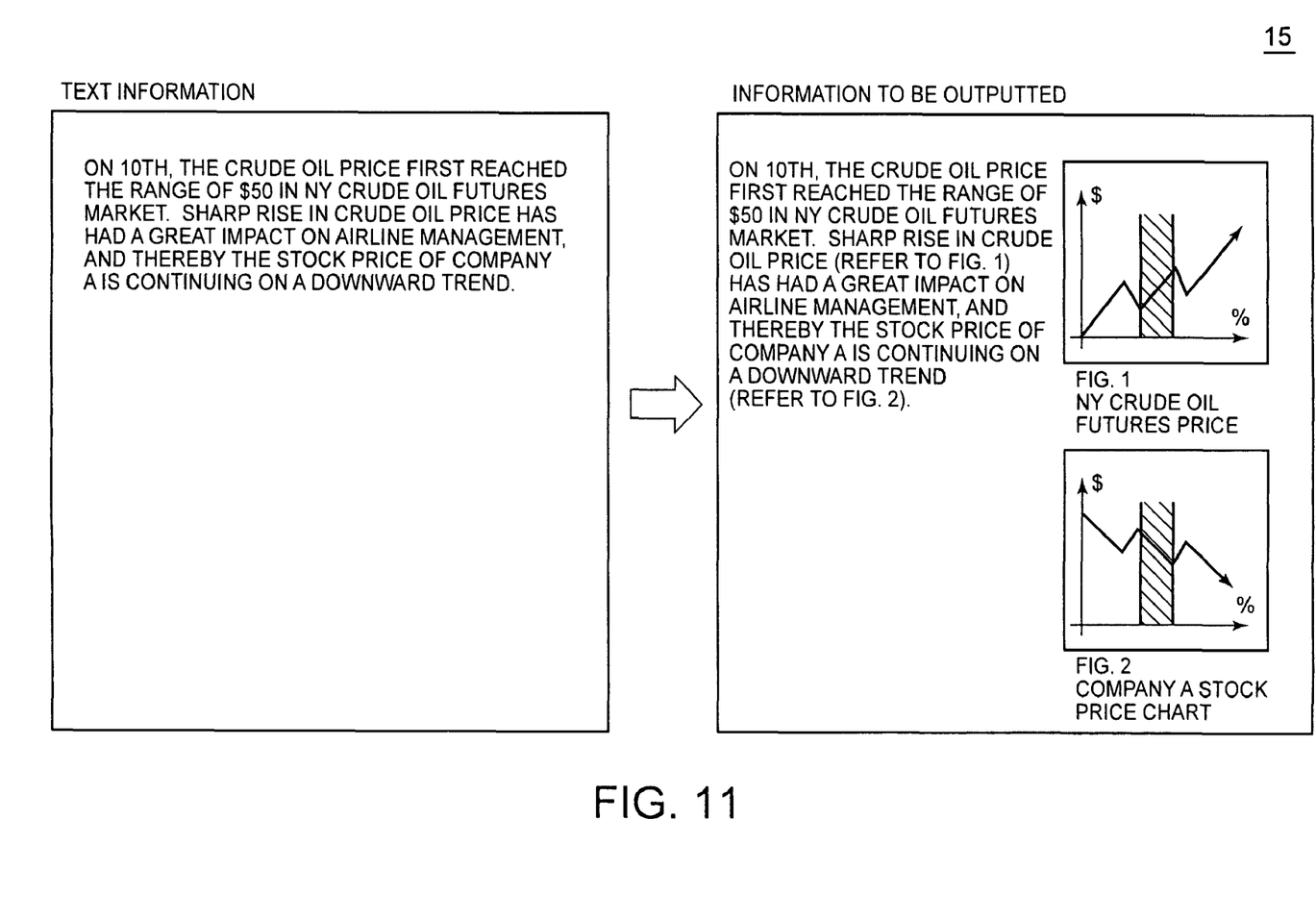
FIG. 11 illustrates a display example of the screen of the user terminal in the information-processing apparatus of FIG. 3 in the third embodiment illustrated in FIG. 10.

FIG. 10 illustrates a process flow in the example illustrating a third embodiment of the present invention, where the information-processing apparatus 30 of FIG. 3 outputs the text information in association with the numerical information. FIG. 11 illustrates a display example of a screen of a user terminal 15 in the information-processing apparatus 30 of FIG. 3 in the example of the third embodiment illustrated in FIG. 10. This example, pertaining to the third embodiment, illustrates accurately detecting the numerical information associated with certain text information, and attaching a drawing to the text information for creating an easy to follow document.

This example illustrating the third embodiment aims illustrates: accurately detecting the numerical information associated with certain text information; and attaching a drawing to the text information for creating an easy to follow document.

First, the generation unit 300 generates, for each of the plurality of pieces of numerical information, a first phrase expressing a change of the numerical information at least in one period, in association with the period and the numerical information. The generated first phrase is stored in the first phrase DB 310 (S1000). Next, the text selection unit 360 selects certain text information from among the pieces of text information stored in the database apparatus 20 based on the instruction received from the user (S1010). The text information selected in this example is on news articles about a sharp rise in crude oil price in the NY crude oil futures market.

Next, the extracting unit 370 extracts a second phrase representing a change of at least one piece of numerical information from the selected text information (S1020). For example, the numerical information is on a "NY crude oil futures price", and the second phrase is on a "sharp rise", or the like. In addition, the numerical information is on a "stock price of Company A", and the second phrase is on a "decline" etc. Subsequently, the second retrieval unit 380, by retrieving the first phrase using a retrieval condition including the second phrase, retrieves a period corresponding to the first phrase matching with the retrieval condition in the numerical information in which the second phrase represents the change (S1030). When the first phrase matching with the second phrase cannot be retrieved, the second retrieval unit 380 may retrieve the first phrase matching with a phrase having a meaning opposite to the second phrase. For example, when the second phrase is "sharp rise", the second retrieval unit 380 may retrieve the first phrase matching with a phrase such as "sharp decline" or the like. As a result of this, even if directions of the change are different, the period having the same magnitude of the change and speed of the change can be retrieved, enabling to enhance flexibility of the retrieval. As one of the examples, even when the period regarding the sharp rise in the crude oil price cannot be retrieved, a period closely associated thereto such as a period while the export volume of the crude oil is sharply decreasing, can be retrieved.

Subsequently, in order to output the numerical information in the period retrieved by the second retrieval unit 380 in association with the second phrase in the text information, the output unit 390 outputs the text information and the numerical information (S1040). For example, the output unit 390 may embed a reference to a drawing number into the text, while the visualizing unit 500, by showing a portion indicating the period corresponding to the first phrase matching with the second phrase with a band of oblique lines so as to be identifiable for a user, may display the portion of the period in association with the second phrase.

Figure 12:
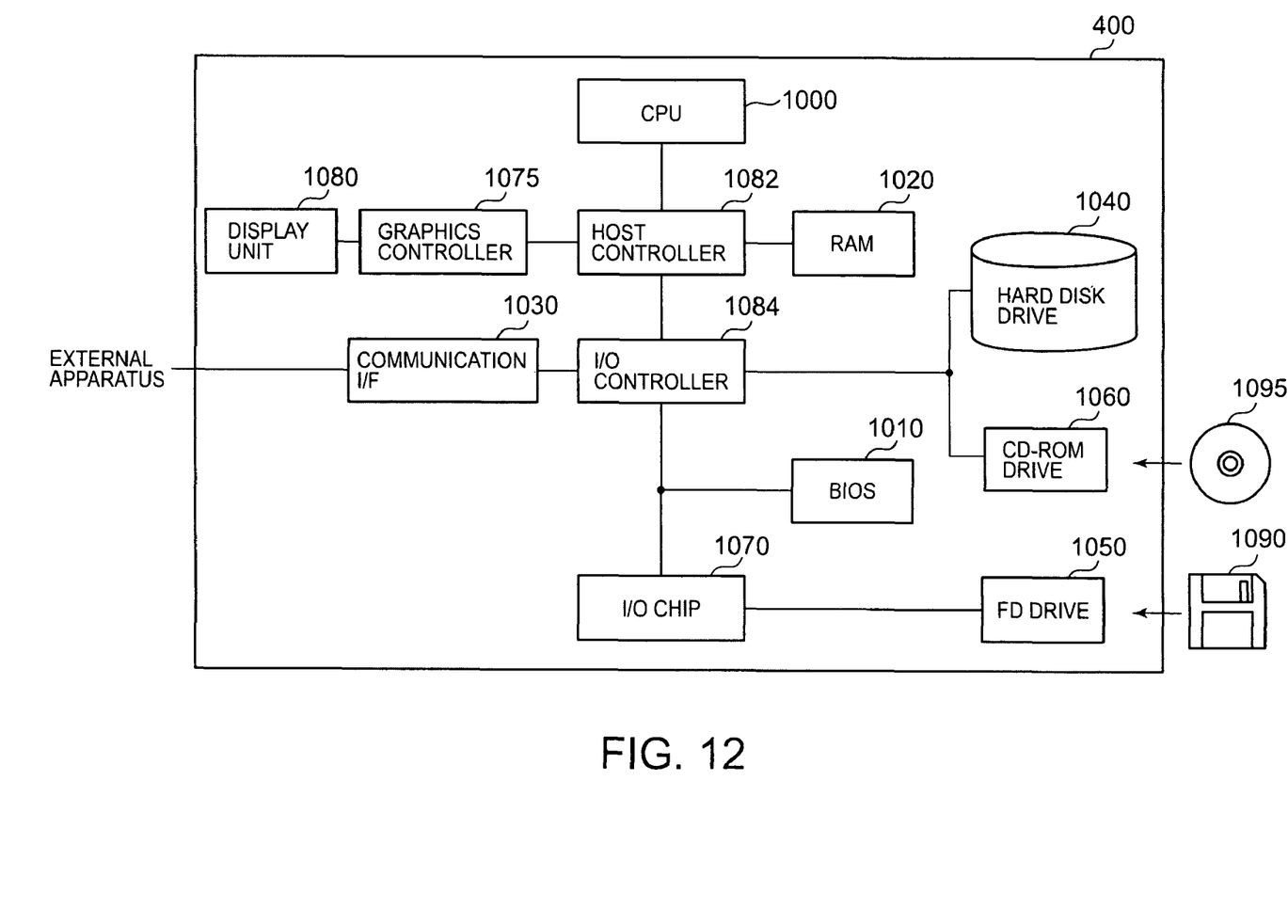
FIG. 12 illustrates an example of a hardware configuration of an information-processing apparatus for serving as the information-processing apparatus in the embodiments of the present invention.

FIG. 12 illustrates an example of a hardware configuration of an information-processing apparatus 400 for serving as the information-processing apparatus 30 in each of the aforementioned embodiments of the present invention. The information-processing apparatus 400 is provided with a CPU peripheral part having a CPU 1000, a RAM 1020, and a graphics controller 1075, which are mutually connected by a host controller 1082, an I/O section having a communication interface 1030, a hard disk drive 1040, and a CD-ROM drive 1060, which are connected with the host controller 1082 through an I/O controller 1084, and a legacy I/O section having a BIOS 1010, a flexible disk drive 1050, and an I/O chip 1070, which are connected with the I/O controller 1084.

The host controller 1082 connects the RAM 1020 with the CPU 1000 accessing the RAM 1020 at a high transfer rate, and the graphics controller 1075. The CPU 1000 operates based on a program product stored in the BIOS 1010 and the RAM 1020, and controls each section. The graphics controller 1075 acquires image data that the CPU 1000 or the like generates on a frame buffer provided in the RAM 1020, and displays the data on the display unit 1080. Alternatively, the graphics controller 1075 may internally include the frame buffer for storing the image data generated by the CPU 1000 or the like.

The I/O controller 1084 connects the host controller 1082 with the communication interface 1030 which is a comparatively high speed I/O device, the hard disk drive 1040, and the CD-ROM drive 1060. The communication interface 1030 communicates with an external apparatus via a network. The hard disk drive 1040 stores a program product and data that the information-processing apparatus 400 uses. The CD-ROM drive 1060 reads a program product or data from a CD-ROM 1095, and provides the same to the RAM 1020 or the hard disk drive 1040.

Meanwhile, the BIOS 1010 and comparatively low speed I/O devices such as a flexible disk drive 1050 or an I/O chip 1070, are connected to the I/O controller 1084. The BIOS 1010 stores a boot program product that the CPU 1000 executes, at the time of booting the information-processing apparatus 400, a program product depending on the hardware of the information-processing apparatus 400, or the like. The flexible disk drive 1050 reads a program product or data from a flexible disk 1090, and provides the same to the RAM 1020 or the hard disk drive 1040 via the I/O chip 1070. The I/O chip 1070 connects the flexible disk 1090 with various kinds of I/O devices via, for example, a parallel port, a serial port, a keyboard port, a mouse port, or the like.

The program product provided to the information-processing apparatus 400 is stored in a recording medium such as the flexible disk 1090, the CD-ROM 1095, or an IC card, and is provided by the user. The program product is read from the recording medium via the I/O chip 1070 and/or the I/O controller 1084, and is installed in the information-processing apparatus 400 to be executed. Since the operation which the program product causes the information-processing apparatus 400 or the like to execute is the same as that in the information-processing apparatus 30 described in FIG. 1 through FIG. 11, description thereof will be omitted.

The program product described above may be stored in an external storage medium. As the storage medium, in addition to the flexible disk 1090 and the CD-ROM 1095, it is possible to use an optical recording medium such as a DVD, a PD, or the like, a magnetooptical recording medium such as MD or the like, a tape medium, a semiconductor memory such as an IC card or the like. Moreover, using, as a recording medium, a memory apparatus such as a hard disk, a RAM, or the like provided in a server system connected to a private telecommunication network or the Internet, it is allowed to provide the program product to the information-processing apparatus 400 via the network.

As described above, according to these embodiments, it is possible to accurately retrieve the text information closely associated with the numerical information such as the time-series data, or to accurately retrieve the numerical information closely associated with the text information. As a result of this, as described in the first embodiment, the news articles associated with the fluctuation in price in the period can be displayed in association with the unstructured information such as the stock price chart of a certain specific company, and a specific period. Moreover, as described in the second embodiment, if a certain specific retrieval key is entered, it is possible to accurately retrieve the structured information such as the stock price chart matching with the specific retrieval key, and the unstructured information such as the news articles matching therewith, and to display the same in association with each other. Moreover, as described in the third embodiment, it is possible to accurately detect the numerical information associated with certain text information and to attach a drawing to the text information for creating an intelligible document.

As mentioned above, the present invention has been described using the embodiments, however, the technical scope of the present invention is not limited to the scope described in the aforementioned embodiments. It is obvious to a person skilled in the art that a variety of modification or improvement can be added to the aforementioned embodiments. It is clear from the description of claims that such an embodiment to which the modification and the improvement are added can also be included in the technical scope of the present invention.

What is claimed is:

1. An information processing device for associating first text information with first numerical information of a time series of a given indicator, comprising:
   a first phrase database for storing a first phrase, representing a change in first numerical information over a first time period, generated based on changes in said first numerical information, in association with the first time period and with the first numerical information;
   wherein, said first phrase indicates whether said first numerical information has risen, declined, or stably shifted according to one or more predetermined thresholds within the first time period;
   an associating portion for associating said first numerical information and first text information based on said first phrase;

an outputting portion for outputting said first numerical information and said first text information for said first time period corresponding to said first phrase, associated by said associating portion;

said associating portion comprises a first retrieving portion that retrieves said first text information using a first retrieval condition that includes said first phrase, wherein said first retrieving portion normalizes an instance of the first phrase with a superordinate concept or a subordinate concept with a predetermined synonym dictionary, and wherein said first retrieving portion retrieves said first text information including said normalized instance of the first phrase;

said outputting portion outputs said retrieved first text information associated with said first numerical information in said first time period;

said first phrase database stores said first phrase that indicates a change in said first numerical information in the first time period, and associated with the first numerical information, for each of a plurality of second numerical information including said first numerical information; wherein said associating portion comprises a central processing unit controlling:

an extracting portion for extracting, from said retrieved first text information, a second phrase indicating a change in third numerical information;

an index registration unit for registering the second phrase as first index information for each of a plurality of pieces of the retrieved first text information;

a second phrase database for storing the registered first index information;

a second retrieving portion for retrieving, from said second numerical information, a fourth numerical information associated with said first phrase that satisfies second retrieval conditions, using the second retrieval conditions including said second phrase;

the second retrieving portion configured to retrieve a second time period corresponding to the first phrase matching said second retrieval conditions including said second phrase, in which the second phrase indicates the change in the third numerical information;

wherein:

said outputting portion further outputs by a command of the central processing unit, in association with said retrieved first text information, said fourth numerical information, retrieved by said second retrieving portion including said second time period.

2. The information processing device as set forth in claim 1, wherein:

said outputting portion:

outputs so as to display to a user said retrieved first text information retrieved by said first retrieving portion so that a location corresponding to said first retrieval conditions is identifiable; and outputs so as to display said fourth numerical information to the user when said location corresponding to said first retrieval conditions is selected by the user.

* * * * *